(12) United States Patent
Varanasi et al.

(10) Patent No.: US 11,642,674 B2
(45) Date of Patent: May 9, 2023

(54) ARTICLES AND SYSTEMS INVOLVING REACTION PRODUCTS ON SURFACES AND ASSOCIATED METHODS

(71) Applicant: Massachusetts Institute of Technology, Cambridge, MA (US)

(72) Inventors: Kripa K. Varanasi, Lexington, MA (US); Maher Damak, Cambridge, MA (US); Nasim Hyder, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/945,740

(22) Filed: Jul. 31, 2020

(65) Prior Publication Data

US 2021/0046478 A1    Feb. 18, 2021

Related U.S. Application Data

(63) Continuation of application No. 16/351,403, filed on Mar. 12, 2019, now abandoned.
(Continued)

(51) Int. Cl.
*B01L 3/00*     (2006.01)
*B01J 13/22*    (2006.01)
*A01N 59/00*    (2006.01)

(52) U.S. Cl.
CPC ......... *B01L 3/502761* (2013.01); *B01J 13/22* (2013.01); *A01N 59/00* (2013.01); *B01L 2300/08* (2013.01)

(58) Field of Classification Search
None
See application file for complete search history.

(56) References Cited

U.S. PATENT DOCUMENTS

| 4,610,311 A | 9/1986 | Bronner et al. |
| 5,504,054 A | 4/1996 | Murphy |

(Continued)

FOREIGN PATENT DOCUMENTS

| CA | 2340045 | 2/2000 |
| EP | 0660999 | 7/1995 |

(Continued)

OTHER PUBLICATIONS

Andelman et al., Polyelectrolyte adsorption. Comptes Rendus Académeie Sci.—Ser. IV—Phys. Nov. 2000; 1(9): 1153-62.
(Continued)

*Primary Examiner* — Kyung S Chang
(74) *Attorney, Agent, or Firm* — Wolf, Greenfield & Sacks, P.C.

(57) ABSTRACT

Methods related to forming reaction products on surfaces are generally provided. Some methods comprise applying first and second polyelectrolytes in first and second polyelectrolyte carrier fluids to a surface. The first and second polyelectrolytes may be different, and the first and second carrier fluids may be the same or different. Some methods comprise forming a mixture of the first and second polyelectrolytes in a mixture carrier fluid that comprises the first and/or second carrier fluids. The first and second polyelectrolyte may be removed from the mixture carrier fluid to form a reaction product on the surface. In some embodiments, the mixture carrier fluid comprises a salt with a molecular weight of less than or equal to 1 kg/mol at a concentration within the mixture carrier fluid of from 0.01 M to 0.5 M. In some embodiments, the mixture carrier fluid has a turbidity of greater than or equal to 10 NTU and a viscosity of less than or equal to 1 Pa*s.

16 Claims, 6 Drawing Sheets

Related U.S. Application Data

(60) Provisional application No. 62/641,813, filed on Mar. 12, 2018.

(56) References Cited

U.S. PATENT DOCUMENTS

| | | | |
|---|---|---|---|
| 5,700,559 | A | 12/1997 | Sheu et al. |
| 5,874,096 | A | 2/1999 | Hazen |
| 6,214,771 | B1 | 4/2001 | Dexter |
| 6,221,811 | B1 | 4/2001 | Policello et al. |
| 6,534,563 | B1 | 3/2003 | Bergeron et al. |
| 7,045,087 | B2 | 5/2006 | Kotov et al. |
| 8,689,726 | B2 | 4/2014 | Krogman et al. |
| 10,897,893 | B2 | 1/2021 | Varanasi et al. |
| 2004/0265603 | A1 | 12/2004 | Schlenoff et al. |
| 2005/0191430 | A1 | 9/2005 | Rubner et al. |
| 2006/0029808 | A1 | 2/2006 | Zhai et al. |
| 2007/0077276 | A1 | 4/2007 | Haynie |
| 2007/0104849 | A1 | 5/2007 | McClements et al. |
| 2007/0243237 | A1 | 10/2007 | Khaled et al. |
| 2008/0020402 | A1 | 1/2008 | Haynie |
| 2008/0241228 | A1 | 10/2008 | Haynie |
| 2009/0226529 | A1 | 9/2009 | Quellet et al. |
| 2010/0003499 | A1 | 1/2010 | Krogman et al. |
| 2010/0016392 | A1 | 1/2010 | Kabanov et al. |
| 2011/0177951 | A1 | 7/2011 | Toledano et al. |
| 2012/0269973 | A1 | 10/2012 | Krogman et al. |
| 2013/0129907 | A1 | 5/2013 | Popa et al. |
| 2013/0165525 | A1 | 6/2013 | Scheuing et al. |
| 2013/0165572 | A1 | 6/2013 | Scheuing et al. |
| 2013/0192835 | A1 | 8/2013 | Vorderbruggen et al. |
| 2014/0193644 | A1 | 7/2014 | Dressick et al. |
| 2014/0256545 | A1 | 9/2014 | Velev et al. |
| 2015/0038442 | A1 | 2/2015 | Van der Krieken et al. |
| 2016/0296985 | A1 | 10/2016 | Dhiman et al. |
| 2017/0135340 | A1* | 5/2017 | Varanasi ............. A01N 25/32 |
| 2019/0344274 | A1 | 11/2019 | Varanasi et al. |
| 2021/0169073 | A1 | 6/2021 | Varanasi et al. |

FOREIGN PATENT DOCUMENTS

| | | | |
|---|---|---|---|
| EP | 2557570 | 2/2013 | |
| JP | 2000-516130 A | 12/2000 | |
| JP | 2010-502433 | 1/2010 | |
| JP | 2011-529392 | 12/2011 | |
| WO | WO 1998/003267 A1 | 1/1998 | |
| WO | WO 2005/041661 | 5/2005 | |
| WO | WO 2009/077908 | 6/2009 | |
| WO | WO 2011/022524 | 2/2011 | |
| WO | WO-2011022524 A1 * | 2/2011 | ............. A61L 15/42 |
| WO | WO 2013/133705 A1 | 9/2013 | |
| WO | WO 2014/040119 | 3/2014 | |
| WO | WO 2015/025979 A2 | 2/2015 | |
| WO | WO 2017/070375 | 4/2017 | |

OTHER PUBLICATIONS

De Rutter et al., Influence of surfactants and plant species on leaf retention of spray solutions. Weed Sci. Nov. 1990;38(6):567-72.
Massinon et al., Comparison of spray retention on synthetic superhydrophobic surface with retention on outdoor grown wheat leaves. Int. Adv. Pestic. Appl. Asp. Appl. Biol. Jan. 2012; 114:261-8.
International Search Report and Written Opinion for Application No. PCT/US2019/021938 dated Sep. 11, 2019.
International Search Report and Written Opinion for PCT/US2016/057956 dated Jan. 12, 2017.
International Preliminary Report on Patentability dated May 3, 2018 for Application No. PCT/US2016/057956.
Invitation to Pay Additional Fees mailed Jul. 9, 2019 for Application No. PCT/US2019/021938.
International Preliminary Report on Patentability dated Sep. 24, 2020 for Application No. PCT/US2019/021938.
[No Author Listed], Starch. Water Structure and Science. 2014. 6 pages. http://www1.lsbu.ac.uk/water/starch.html.
Abhilash et al., Pesticide use and application: An Indian scenario. J Hazard Mater. 2009; 165:1-12. Epub Nov. 1, 2008.
Anand et al., Enhanced condensation on lubricant-impregnated nanotextured surfaces. ACS Nano. 2012;6(11):10122-9. Epub Oct. 2, 2012.
Antunes et al., Layer-by-layer self-assembly of chitosan and poly (γ-glutamic acid) into polyelectrolyte complexes. Biomacromolecules. Oct. 2011;12:4183-95.
Aytouna et al., Impact dynamics of surfactant laden drops: dynamic surface tension effects. Exp. Fluids. 2010;48:49-57. Epub Jul. 7, 2009.
Bakeev et al., Kinetics and mechanism of interpolyelectrolyte exchange and addition reactions. Macromolecules. Mar. 1992;25(17):4249-54.
Bartolo et al., Dynamics of non-Newtonian droplets. Phys. Rev. Lett. Oct. 2007;99(17):174502(1-4).
Bartolo et al., Retraction dynamics of aqueous drops upon impact on non-wetting surfaces. J. Fluid Meeh. 2005;545:329-38.
Bassil et al., Cancer health effects of pesticides. Can. Fam. Physician. Oct. 2007;53:1704-11.
Bergeron et al., Controlling droplet deposition with polymer additives. Nature. Jun. 15, 2000;405:772-5.
Bergeron, Designing intelligent fluids for controlling spray applications. Comptes Rendus Phys. 2003;4:211-219.
Biance et al., On the elasticity of an inertial liquid shock. J. Fluid Meeh. 2006;554:47-66.
Bird et al., Reducing the contact time of a bouncing drop. Nature. Nov. 21, 2013;503:385-8. including Suppl Info. 14 pages.
Blossey, Self-cleaning surfaces—virtual realities. Nat. Mater. May 2003;2(5):301-6.
Bocquet et al., A smooth future? Nat. Mater. May 2011;10:334-7.
Cassie et al., Wettability of porous surfaces. Trans Faraday Soc. Jan. 1944;40:546-51.
Clanet et al., Maximal deformation of an impacting drop. J. Fluid Meeh. 2004;517:199-208.
Clark et al., Ionic effects of sodium chloride on the templated deposition of polyelectrolytes using layer-by-layer ionic assembly. Macromolecules. Aug. 1997;30(23):7237-44.
Croll et al., A blank slate? Layer-by-layer deposition of hyaluronic acid and chitosan onto various surfaces. Biomacromolecules. 2006;7(5):1610-22.
Damak et al., Enhancing droplet deposition through in-situ precipitation. Nat Comm. Nov. 2, 2016;7(1):1-9.
Damak, Droplet Deposition on hydrophobic surfaces for agricultural sprays. 2015 MIT Master's Thesis. Department of Mechanical Engineering, Massachusetts Institute of Technology, 55 pages. Submitted Jun. 2015. Available to the public Mar. 25, 2016.
De Gennes, Wetting: statics and dynamics. Rev. Mod. Phys. Jul. 1985;57(3):827-63.
De Ruiter et al., Dynamics of collapse of air films in drop impact. Phys. Rev. Lett. Feb. 2012;108:074505(1-4).
De Vasconcelos et al., Effect of molecular weight and ionic strength on the formation of polyelectrolyte complexes based on poly(methacrylic acid) and chitosan. Biomacromolecules. Apr. 2006;7(4):1245-52.
Decher et al., Fuzzy nanoassemblies: Toward layered polymeric multicomposites. Science. Aug. 1997;277(5330):1232-7.
Deng et al., Liquid drops impacting superamphiphobic coatings. Langmuir. 2013; 29(25):7847-56.
Deng et al., Nonwetting of impinging droplets on textured surfaces. Appl. Phys. Lett. 2009:94:133109(1-3). Epub Apr. 2, 2009.
Dimitrova et al., Sustained delivery of siRNAs targeting viral infection by cell-degradable multilayered polyelectrolyte films. Proc. Natl. Acad. Sci. Oct. 2008;105(42):16320-5.
Duez et al., Making a splash with water repellency. Nat Phys. Mar. 2007;3:180-3. Epub Feb. 25, 2007.
Ellis et al., How surface tension of surfactant solutions influences the characteristics of sprays produced by hydraulic nozzles used for pesticide application. Colloids Surf A Physicochem. Eng. Asp. 2001;180:267-76.
Fang et al., Hydrophobicity mechanism of non-smooth pattern on surface of butterfly wing. Chin. Sci. Bull. Mar. 2007;52(5):711-6.

(56) References Cited

OTHER PUBLICATIONS

Forster et al., Improved method for leaf surface roughness characterisation, in Proceedings of the 6th International Symposium on Adjuvants for Agrochemicals. ISAA 2001 Foundation. Aug. 2001;113-118.

Fu et al., Construction of anti-adhesive and antibacterial multilayer films via layer-by-layer assembly of heparin and chitosan. Biomaterials. 2005;26:6684-92. Epub Jun. 6, 2005.

Fuoss et al., Mutual Interaction of Polyelectrolytes. Science. Nov. 25, 1949;110(2865):552-4.

Furmidge et al., Studies at phase interfaces. I. The sliding of liquid drops on solid surfaces and a theory for spray retention. J. Colloid Sci. 1962;17:309-24.

Furstner et al., Wetting and self-cleaning properties of artificial superhydrophobic surfaces. Langmuir. 2005;21:956-61. Epub Jan. 6, 2005.

Gaskin et al., Characterising plant surfaces for spray adhesion and retention. N. Z. Plant Prot., Proceedings of a Conference, Wellington, New Zealand, Aug. 9-11, 2005;58:179-83.

Gilliom et al., Pesticides in the nation's streams and ground water, 1992-2001. Circular 1291. (Geological Survey (US), 2006, Revised Feb. 15, 2007). 184 pages.

Govt of India, Ministry of Agriculture, State of Indian Agriculture Dec. 2011. 2012. At http://www.agricoop.nic.in/sia111213312.pdf. 294 pages.

Graham et al., Dynamics of droplet coalescence in response to increasing hydrophobicity. Phys. Fluids. 2012;24:112105(1-20). Epub Nov. 27, 2012.

Hao et al., Superhydrophobic-like tunable droplet bouncing on slippery liquid interfaces. Nat. Commun. Aug. 7, 2015;6(7986):1-7.

Huang et al., Integrating interfacial self-assembly and electrostatic complexation at an aqueous interface for capsule synthesis and enzyme immobilization. J Mater Chem A. 2014;2:1672-6. Epub Dec. 2, 2013.

Izquierdo et al., Dipping versus spraying: exploring the deposition conditions for speeding up layer-by-layer assembly. Langmuir. Mar. 2005;21:7558-67.

Jaffna, English: water droplets in a lotus leaf. at <http://commons.wikimedia.org/wiki/File:Water_droplets_in_a_lotus_leaf.JPG>, Mar. 2014; 3 pages.

Janeesh et al., Biocompatibility and genotoxicity studies of polyallylamine hydrochloride nanocapsules in rats. RSC Advances. 2016: 1-31. Manuscript. Date submitted by author: May 3, 2014.

Jayaratne et al., The coalescence and bouncing of water drops at an air/water interface. Proceedings of the Royal Society of London A: Mathematical, Physical and Engineering Sciences. 1964;280:545-65.

Jeyaratnam, Acute pesticide poisoning: a major global health problem. World Health Stat. Q. Rapp. Trimest. Stat. Sanit. Mond. 1990;43:139-44.

Jiang et al., A lotus-leaf-like superhydrophobic surface: a porous microsphere/nanofiber composite film prepared by electrohydrodynamics. Angew. Chem. 2004;116:4438-41.

Joanny et al., A model for contact angle hysteresis. J. Chem. Phys. Jul. 1, 1984;81(1):552-62.

Krogman et al., Spraying asymmetry into functional membranes layer-by-layer. Nat Mater. Jun. 2009;8(6):512-8. doi: 10.1038/nmat2430. Epub Apr. 19, 2009.

Kumar et al., A review: polyelectrolyte polysaccharides nanoparticles on diabetic mellitus. Indo Am. J. Pharm. Res. 2013;3(1):1446-57.

Kwon et al., Rapid deceleration-driven wetting transition during pendant drop deposition on superhydrophobic surfaces. Phys. Rev. Lett. Jan. 2011;106:036102(1-4).

Lafuma et al., Superhydrophobic states. Nat. Mater. 2003;2(7):457-60. Epub Jun. 22, 2003.

Leslie et al., A bioinspired omniphobic surface coating on medical devices prevents thrombosis and biofouling. Nat. Biotechnol. Nov. 2014;32(11):1134-40, Suppl information, 3 pgs. Epub Oct. 12, 2014.

Liao et al., Controlled release from fibers of polyelectrolyte complexes. J Control Release. May 18, 2005;104(2):347-58. Epub Apr. 7, 2005.

Liu et al., Artificial lotus leaf structures from assembling carbon nanotubes and their applications in hydrophobic textiles. J. Mater. Chem. 2007;17:1071-8. Epub Dec. 18, 2006.

Liu et al., Layer-by-layer electrostatic self-assembly of nanoscale $Fe_3O_4$ particles and polyimide precursor on silicon and silica surfaces. Appl Phys Lett. Oct. 1997;71(16)2265-67.

Liu et al., Pancake bouncing on superhydrophobic surfaces. Nat. Phys. Jul. 2014;10:515-9. Epub Jun. 8, 2014.

Logan City Council,The Greenbank Mozzie. at <https://safegreenbanknow.wordpress.com/tag/logan-city-council/> 2014. 5 pages.

Mannetje et al., Trapping of drops by wetting defects. Nat Commun. 2014. 5(3559):1-7.

Martens et al., Fertilizer applications for correcting micronutrient deficiencies. Micronutrients in Agriculture ($2^{nd}$ Ed). SSSA Book Series, No. 4, Ch. 15, 1991, pp. 549-553.

McKinley et al., Wolfgang von Ohnesorge. Phys Fluids. 2011;23:127101(1-6). Epub Dec. 7, 2011.

McKinley, Dimensionless groups for understanding free surface flows of complex fluids. Hatsopoulos Microfluids Lab., Dept of Mech Eng., MIT. HML rpt No. 05-P-05. For publication in SOR Rheol Bull. Jul. 2005;9 pages.

Michaels et al., Polycation-polyanion complexes: Preparation and properties of poly-(vinylbenzyltrimethylammonium) poly-(styrenesulfonate). J. Phys. Chem. Oct. 1961;65(10):1765-73.

Miljkovic et al., Condensation heat transfer on superhydrophobic surfaces. MRS Bull. May 2013;38:397-406.

Mjahed et al., Turbidity diagrams of polyanion/polycation complexes in solution as a potential tool to predict the occurrence of polyelectrolyte multilayer deposition. J Colloid Interface Sci. Jun. 1, 2010;346(1):163-71. doi: 10.1016/j.jcis.2010.02.042. Epub Feb. 21, 2010.

Mock et al., Drop impact on chemically structured arrays. J. Phys. Condens. Matter. Feb. 2005;17:S595-605.

Netz et al., Polyelectrolytes in solution and at surfaces. Encyclopedia of Electrochem. Wiley-VCH, vol. 1, Chpt. 2.7, 282-321 (2002).

Orme, Experiments on droplet collisions, bounce, coalescence and disruption. Prog. Energy Combust. Sci. 1997;23:65-79.

Pamin et al., Electrostatic self-assembly of polyoxometalates on chitosan as catalysts of oxidation of cyclic hydrocarbons. Catal Lett. 2009;127:167-74. Epub Oct. 3, 2008.

Patankar et al., Mimicking the lotus effect: influence of double roughness structures and slender pillars. Langmuir. 2004;20:8209-13. Epub Aug. 6, 2004.

Paxson et al., Self-similarity of contact line depinning from textured surfaces. Nat. Commun. Feb. 2013;4:1492(1-8).

Peaker et al., Light-scattering methods for the chemical characterization of polymers. Review. Analyst. 1960;85:235-44.

Philipp et al., Polyelectrolyte complexes—recent developments and open problems. Prog Polym Sci. 1989;14:91-172.

Pimentel et al., Environmental and economic costs of pesticide use. BioScience. Nov. 1992;42(10):750-60.

Pimentel et al., Pesticides: amounts applied and amounts reaching pests. BioScience. Feb. 1, 1986;36(2):86-91 (1986).

Pionke et al., Nature and extent of groundwater contamination by pesticides in an agricultural watershed. Water Res. 1989;23(2):1031-7.

Porcel et al., Ultrathin coatings and (poly(glutamic acid)/polyallylamine) films deposited by continuous and simultaneous spraying. Langmuir. 2005;21(2):800-2. Epub Dec. 17, 2004.

Quere et al., Non-sticking drops. Rep. Prog. Phys. Sep. 2005;68:2495-532.

Quere et al., Wetting and roughness. Annu Rev Mater Res. 2008;38:71-99.

Rein, Phenomena of liquid drop impact on solid and liquid surfaces. Fluid Dyn. Res. Aug. 1993;12(2):61-93.

Richard et al., Bouncing water drops. Europhys. Lett. Jun. 15, 2000;50(6):769-75.

(56) References Cited

OTHER PUBLICATIONS

Richard et al., Surface phenomena: Contact time of a bouncing drop. Nature. Jun. 2002;417(6891):811-2.
Rioboo et al., Time evolution of liquid drop impact onto solid, dry surfaces. Exp. Fluids. 2002;33:112-24.
Rozhkov et al., Impact of drops of polymer solutions on small targets. Phys. Fluids. Jul. 2003;15(7):2006-2019.
Sanborn et al., Non-cancer health effects of pesticides. Can. Fam. Physician. Oct. 2007;53:1712-20.
Schlenoff et al., Sprayed polyelectrolyte multilayers. Langmuir. Oct. 2000;16(26):9968-69.
Shelton et al., Neurodevelopmental disorders and prenatal residential proximity to agricultural pesticides: the CHARGE study. Env. Health Perspect. Oct. 2014;122(10):1103-9.
Silva et al., Films based on chitosan polyelectrolyte complexes for skin drug delivery: Development and characterization. J. Membr. Sci. 2008;320:268-79. Epub Apr. 12, 2008.
Smith et al., Droplet mobility on lubricant-impregnated surfaces. Soft Matter. Feb. 14, 2013;9(6):1772-80. Epub Dec. 17, 2012.
Smith et al., Droplet size and leaf morphology effects on pesticide spray deposition. Trans. ASAE-Am. Soc. Agric. Eng. 2000;43(2):255-9.
Smith et al., The anti-rebound effect of flexible polymers on impacting drops, in Proceedings of 23rd Annual Conference on Liquid Atomization Spray Systems Europe (ILASS—Europe 2010). Sep. 2010; 124:1-8.
Snyder et al., Frost Protection: fundamentals, practice and economics. FAO Environment and Natural Resources Service Series (FAO—Rome 2005). Feb. 2005;1:1-240.
Spruijt et al., Linear viscoelasticity of polyelectrolyte complex coacervates.Macromolecules. Feb. 2013;46:1633-41.
Sukhishvili et al., Where polyelectrolyte multilayers and polyelectrolyte complexes meet. Macromolecules. Dec. 26, 2006;39(26):8873-81.
Sun et al., Artificial lotus leaf by nanocasting. Langmuir. 2005;21(19):8978-81.
Thünemann et al., Polyelectrolyte complexes. Adv Polym Sci. 2004;166:113-71. doi: 10.1007/bll350.
Turgeon et al., Protein-polysaccharide interactions: phase-ordering kinetics, thermodynamic and structural aspects. Curr Opin Colloid Interface Sci. 2003;8:401-14.
Varanasi et al., Frost formation and ice adhesion on superhydrophobic surfaces. Appl. Phys. Lett. 2010. 97:234102(1-3). Epub Dec. 7, 2010.
Varanasi et al., Spatial control in the heterogeneous nucleation of water. Appl. Phys. Lett. 2009. 95:094101(1-3). Epub Aug. 31, 2009.
Wenzel et al., Resistance of solid surfaces to wetting by water. Ind. Eng. Chem. Aug. 1936;28(8):988-94.
Wisniewska et al., Comparison of adsorption affinity of polyacrylic acid for surfaces of mixed silica-alumina. Colloid Polym. Sci. 2014;292:699-705. Epub Nov. 23, 2013.
Wood et al., Controlling interlayer diffusion to achieve sustained, multiagent delivery from layer-by-layer thin films. Proc. Natl. Acad. Sci. Jul. 5, 2006;103(27):10207-12.
Wood et al., Tunable drug release from hydrolytically degradable layer-by-layer thin films. Langmuir. 2005;21(4):1603-9.
Wu et al., Scaling law in liquid drop coalescence driven by surface tension. Phys. Fluids. Jul. 2004;16(7):L51-L54. Epub May 18, 2004.
Yarin, Drop impact dynamics: Splashing, spreading, receding, bouncing . . . Annu. Rev. Fluid Mech. 2006;38:159-92.
Ye et al., Deposition temperature effect on release rate of indomethacin microcrystals from microcapsules of layer-by-layer assembled chitosan and alginate multilayer films. J. Controlled Release. 2005;106:319-28. Epub Jun. 20, 2005.
Yu et al., Evaporation and deposition coverage area of droplets containing insecticides and spray additives on hydrophilic, hydrophobic, and crabapple leaf surfaces. Trans. ASABE. 2009;52(1):39-49.
Zhang et al., Dynamic surface tension effects in impact of a drop with a solid surface. J. Colloid Interface Sci. 1997;187:166-78.

\* cited by examiner

ARTICLES AND SYSTEMS INVOLVING REACTION PRODUCTS ON SURFACES AND ASSOCIATED METHODS

RELATED APPLICATIONS

This application is a continuation of U.S. application Ser. No. 16/351,403, filed Mar. 12, 2019, and entitled "Articles and Systems Involving Reaction Products on Surfaces and Associated Methods", which claims priority under 35 U.S.C. § 119(e) to U.S. Provisional Application No. 62/641,813, filed Mar. 12, 2018, and entitled "Methods of Forming Reaction Products on Surfaces and Associated Articles and Systems", both of which are incorporated herein by reference in their entirety and for all purposes.

FIELD

The present invention generally relates to methods of forming reaction products on surfaces, and associated articles and systems.

BACKGROUND

Certain consumer products are designed to be applied to surfaces of interest in the form of droplets. In many cases, large fractions of the droplets applied to the surfaces bounce or roll away prior to depositing any active ingredients therein on the surfaces. This phenomenon causes consumers to apply excess amounts of the products to the surfaces, resulting in waste. Accordingly, improved methods that result in enhanced droplet retention on surfaces may be advantageous.

SUMMARY

The present invention generally relates to articles, systems, and methods associated with the formation of reaction products on surfaces. The subject matter of the present invention involves, in some cases, interrelated products, alternative solutions to a particular problem, and/or a plurality of different uses of one or more systems and/or articles.

Certain embodiments relate to articles. In some embodiments, an article comprises a product disposed on a surface. The product is formed by removing a first polyelectrolyte and a second polyelectrolyte from a mixture carrier fluid, the mixture carrier fluid is formed from a first carrier fluid comprising a first polyelectrolyte and a second carrier fluid comprising a second polyelectrolyte, and the mixture carrier fluid comprises a salt with a molecular weight of less than or equal to 1 kg/mol at a concentration within the mixture carrier fluid of from 0.01 M to 0.5 M.

In some embodiments, an article comprises a product disposed on a surface. The product is formed by removing a first polyelectrolyte and a second polyelectrolyte from a mixture carrier fluid, the mixture carrier fluid is formed from a first carrier fluid comprising a first polyelectrolyte and a second carrier fluid comprising a second polyelectrolyte, and the mixture carrier fluid has a turbidity of greater than or equal to 10 NTU and a viscosity of less than or equal to 1 Pa*s.

Certain embodiments relate to compositions and/or kits. In some embodiments, a composition and/or kit comprises a first polyelectrolyte in a first carrier fluid and a second polyelectrolyte in a second carrier fluid. The first and second polyelectrolytes are different, the first and second carrier fluids are configured to form a mixture carrier fluid that comprises the first and/or second carrier fluids, the mixture carrier fluid comprises a salt with a molecular weight of less than or equal to 1 kg/mol at a concentration within the mixture carrier fluid of from 0.01 M to 0.5 M.

In some embodiments, a composition and/or kit comprises a first polyelectrolyte in a first carrier fluid and a second polyelectrolyte in a second carrier fluid. The first and second polyelectrolytes are different, the first and second carrier fluids are configured to form a mixture carrier fluid that comprises the first and/or second carrier fluids, and the mixture carrier fluid has a turbidity of greater than or equal to 10 NTU and a viscosity of less than or equal to 1 Pa*s.

Certain embodiments relate to methods. In some embodiments, a method comprises applying to a surface a first polyelectrolyte in a first carrier fluid and a second polyelectrolyte in a second carrier fluid. The first and second polyelectrolytes may be different. The first and second carrier fluids can be the same or different. The method may further comprise forming a mixture of the first and second polyelectrolytes in a mixture carrier fluid that comprises the first and/or second carrier fluids. The mixture carrier fluid may comprise a salt with a molecular weight of less than or equal to 1 kg/mol at a concentration within the mixture carrier fluid of from 0.01 M to 0.5 M. The method may further comprise removing the first polyelectrolyte and the second polyelectrolyte from the mixture carrier fluid to form a reaction product on the surface.

In some embodiments, a method comprises applying to a surface a first polyelectrolyte in a first carrier fluid and a second polyelectrolyte in a second carrier fluid. The first and second polyelectrolytes may be different. The first and second carrier fluids can be the same or different. The method may further comprise forming a mixture of the first and second polyelectrolytes in a mixture carrier fluid that comprises the first and/or second carrier fluids. The mixture carrier fluid may have a turbidity of greater than or equal to 10 NTU and a viscosity of less than or equal to 1 Pa*s. The method may further comprise removing the first polyelectrolyte and the second polyelectrolyte from the mixture carrier fluid to form a reaction product on the surface. Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
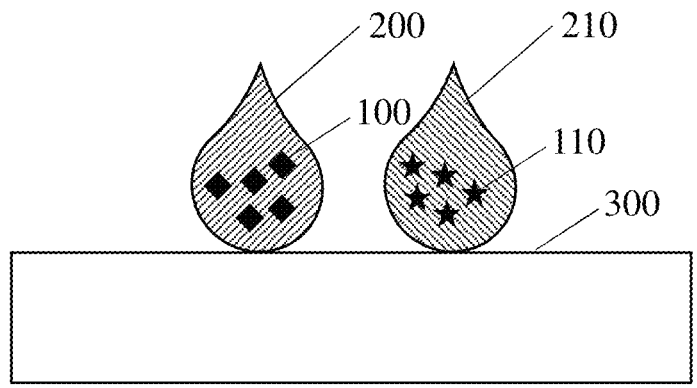
FIGS. 1A-1C show one non-limiting example of a method of forming a reaction product on a surface.

Methods related to forming reaction products on surfaces, and associated articles and systems, are generally provided. The methods may comprise forming reaction products on surfaces that enhance droplet retention thereon, and/or may comprise forming reaction products on surfaces in a manner that enhances droplet retention thereon. For example, reaction products comprising aggregated polyelectrolytes may form under conditions that result in enhanced aggregation of the polyelectrolytes. As another example, reaction products may form from polyelectrolytes present in droplets over time scales that enhance retention of those droplets on the surface, such as time scales shorter than the time scale over which the droplets would interact with and then bounce or roll off the surface. Other examples will be described in further detail below.

Certain methods relate to forming reaction products on surfaces from a mixture carrier fluid that has one or more features that promote the formation of reaction products that enhance droplet retention and/or the formation of reaction products in a manner that enhances droplet retention. Non-limiting examples of such features include the presence of salts in beneficial amounts, the presence of polyelectrolytes in beneficial amounts, a pH in a range in which the zeta potential of each polyelectrolyte therein is within a beneficial range (e.g., above a minimal value), and a viscosity in a beneficial range (e.g., below a maximal value). In some embodiments, a macroscopically observable feature of the carrier fluid, such as its turbidity, may be in a range indicative of the mixture carrier fluid having one or more of the advantageous properties described herein. Macroscopically observable features may be indicative of a mixture carrier fluid from which reaction products that enhance droplet retention may form and/or of a mixture carrier fluid from which reaction products may form in a manner that enhances droplet retention.

Some embodiments relate to articles, compositions, and/or kits. An article composition, and/or kit described herein may be related to a method described herein. By way of example, some articles are products formed by the performance of one or more of the methods described herein. For instance, in some embodiments, an article comprises a product disposed on a surface and is formed according to one or more of the methods described herein. As another example, in some embodiments, a composition and/or a kit is suitable for performing (and/or configured to perform) one or more of the methods described herein. For instance, a composition and/or a kit may comprise one or more components that may be employed in one or more of the methods described herein, such as a first polyelectrolyte (e.g., in a first carrier fluid) and/or a second polyelectrolyte (e.g., in a second carrier fluid). In some embodiments, a composition and/or a kit may be configured to form a mixture carrier fluid described herein and/or to form a product described herein (e.g., on a surface described herein).

In this disclosure, the phrase "reaction product" is used interchangeably with the word "product". Both should be understood to refer species formed by the response of one or more components to a stimulus (e.g., exposure to another component) that causes in the deposition of the "reaction product" or "product" on a surface. The "reaction product" or "product" may comprise all of such components, none of such components, or some of such components.

Figure 1B:
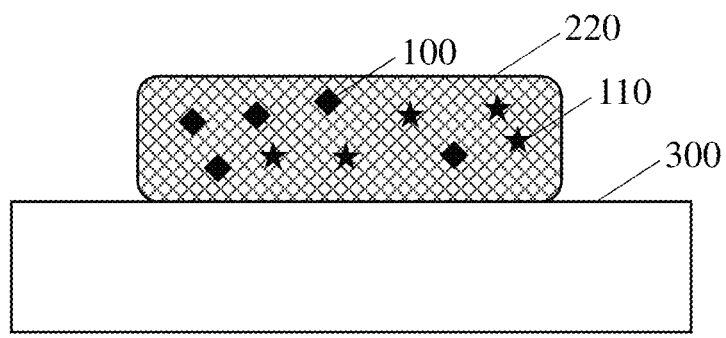
Figure 1C:
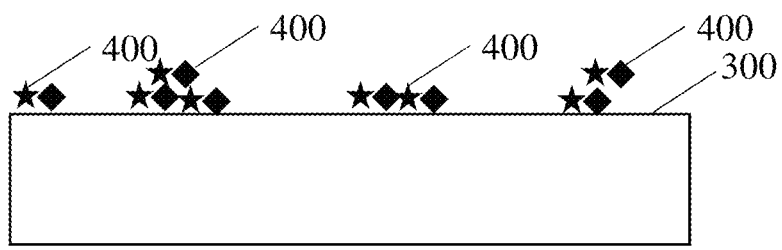

FIGS. 1A-1C show one non-limiting example of a method comprising applying first and second polyelectrolytes in first and second carrier fluids to a surface, forming a mixture of the first and second polyelectrolytes in a mixture carrier fluid, and removing at least a portion of the first polyelectrolyte and at least a portion of the second polyelectrolyte from the mixture carrier fluid to form a reaction product on the surface.

In FIG. 1A, a first polyelectrolyte 100 in a first carrier fluid 200 and a second polyelectrolyte 110 in a second carrier fluid 210 are applied to a surface 300. As shown in FIG. 1A, the first and second polyelectrolytes (and the associated first and second carrier fluids) may be applied to the surface in a manner such that, for a period of time, both the first and second carrier fluids are present on the surface at the same time. The first and second polyelectrolytes may be applied sequentially (e.g., the first polyelectrolyte prior to the second polyelectrolyte, the second polyelectrolyte prior to the first polyelectrolyte), simultaneously (e.g., the first and second polyelectrolytes may be applied to the surface at the same time), or both sequentially and simultaneously (e.g., the first polyelectrolyte and the second polyelectrolyte may be applied to the surface for periods of time that partially, but not completely, overlap). The first and second polyelectrolytes (and/or the associated first and second carrier fluids) may be applied to portions of the surface that do not overlap (e.g., as shown in FIG. 1A), or the first and second polyelectrolytes (and/or the associated first and second carrier fluids) may be applied to portions of the surface that overlap at least partially (e.g., portions that completely overlap). The first and second polyelectrolytes (and/or the associated first and second carrier fluids) may together cover a variety of suitable fractions of the surface (e.g., all of the surface, one or more non-contiguous portions of the surface).

It should be understood that, although FIG. 1A shows application of equal amounts of the first and second carrier fluid to the surface and equal concentration of the first and second polyelectrolytes in the first and second carrier fluids, other configurations are also possible. For example, a larger volume of the first carrier fluid may be applied than of the second carrier fluid (or vice versa). As another example, the first polyelectrolyte may be present in the first carrier fluid at a higher concentration than the second polyelectrolyte in the second carrier fluid (or vice versa). It should also be understood that either or both of the first and second carrier fluids may further comprise one or more species not shown in FIG. 1A (e.g., the first and/or the second carrier fluid may comprise one or more salts). As a third example, the first and second carrier fluids may be the same, or they may be different. In some embodiments, such as that shown in FIG.

1A, the first and second polyelectrolytes are different (e.g., they have different chemical structures, they have opposite charge).

The first and second polyelectrolytes (and the associated first and second carrier fluids) may be applied to surfaces in a variety of suitable manners. In some embodiments, the first and/or second polyelectrolyte may be applied to a surface by contacting droplets of a carrier fluid comprising the polyelectrolyte with the surface. The droplets may be sprayed on the surface, dripped on the surface, or contacted with the surface in another suitable manner. Other methods of applying a polyelectrolyte to a surface are also contemplated for application of the first polyelectrolyte to the surface and/or application of the second polyelectrolyte to the surface. Such methods may include pouring a carrier fluid comprising the polyelectrolyte onto the surface, dipping the surface in a carrier fluid comprising the polyelectrolyte, and the like.

FIG. 1B shows one non-limiting example of a mixture carrier fluid disposed on a surface. In FIG. 1B, a first polyelectrolyte 100 and a second polyelectrolyte 110 are mixed in a mixture carrier fluid 220 disposed on a surface 300. In some embodiments, a first carrier fluid and a second carrier fluid at least partially mix to form the mixture carrier fluid. The mixture carrier fluid may comprise at least a portion of the first carrier fluid, at least a portion of the second carrier fluid, and/or at least a portion of both the first carrier fluid and the second carrier fluid. In some embodiments, at least a portion of the first carrier fluid and/or at least a portion of the second carrier fluid may not be included in the mixture carrier fluid. The mixture carrier fluid may further comprise one or more species not shown in FIG. 1B, such as one or more salts.

A mixture carrier fluid and a mixture of polyelectrolytes therein may be formed in a variety of suitable manners. In some embodiments, a mixture carrier fluid may be formed by topological contact between a first carrier fluid comprising a first polyelectrolyte and a second carrier fluid comprising a second polyelectrolyte. The first and second carrier fluids, and the first and second polyelectrolytes therein, may mix due to thermodynamic driving forces. The topological contact between the carrier fluids may be achieved by applying the first and second carrier fluids, and the first and second polyelectrolytes therein, to a surface in a manner that results in such contact. For instance, the first and second carrier fluids may be applied to a surface on top of one another and/or next to one another. In some embodiments, the first and second carrier fluids may be placed in topological contact prior to topological contact with a surface (e.g., for a short period of time). As an example, the first and second carrier fluids may be applied to the surface in the form of droplets and some such droplets may impinge on each other prior to contact with the surface (e.g., a first droplet comprising a first carrier fluid and a first polyelectrolyte may impinge upon a second droplet comprising a second carrier fluid and a second polyelectrolyte, mix to form a droplet comprising a mixture carrier fluid and the first and second polyelectrolytes, and then that droplet may contact the surface).

Mixtures of two or more polyelectrolytes, such as mixtures of first and second polyelectrolytes, may have a variety of suitable microscopic structures. The polyelectrolytes may interpenetrate with one another in a carrier fluid, such as a mixture carrier fluid, to any suitable extent. In some embodiments, both a first and second polyelectrolyte may be fully solubilized in a mixture carrier fluid. In other embodiments, one or both of the first and second polyelectrolyte may be at least partially phase separated from the mixture carrier fluid and/or may be partially phase separated from one another. The mixture carrier fluid may comprise one or more phases comprising both the first and second polyelectrolyte. In some embodiments, the mixture carrier fluid may further comprise one or more additional phases lacking the first polyelectrolyte and/or the second polyelectrolyte.

Some embodiments relate to reaction products disposed on surfaces. The reaction product disposed on the surface may be formed by a method as described herein, such as a method having one or more features in common with the method shown in FIGS. 1A-1B. FIG. 1C shows one non-limiting example a reaction product disposed on a surface. In FIG. 1C, a reaction product 400 is disposed on a surface 300. As shown in FIG. 1C, the reaction product may comprise the first polyelectrolyte and the second polyelectrolyte. The reaction product may further comprise one or more species not shown in FIG. 1C, such as one or more salts. The reaction product may be formed by removing at least a portion of the first and second polyelectrolytes from a mixture carrier fluid and/or by any other suitable method (e.g., one or more of the methods described herein). The entirety of the first and second polyelectrolytes may be removed from the mixture carrier fluid, or at least a portion of the first polyelectrolyte and/or at least a portion of the second polyelectrolyte may not be removed from the mixture carrier fluid.

As an example of a method of forming a reaction product on a surface from a mixture carrier fluid, at least a portion of the first and at least a portion of the second polyelectrolyte may precipitate from the mixture carrier fluid to form the reaction product. All of the first and/or second polyelectrolyte present in the mixture carrier fluid may precipitate therefrom during formation of the reaction product, or at least a portion of the first polyelectrolyte and at least a portion of the second polyelectrolyte may remain in the mixture carrier fluid during and/or after reaction product formation. As another example, the mixture carrier fluid may evaporate from a mixture of the first and second polyelectrolytes, leaving behind the reaction product on the surface. As a third example, the mixture carrier fluid may bounce or roll off the surface, leaving behind the reaction product on the surface. In such embodiments, the mixture carrier fluid that bounces or rolls of the surface may comprise at least a portion of the first polyelectrolyte and/or at least a portion of the second polyelectrolyte. In some embodiments, the reaction product may comprise minimal amounts of the mixture carrier fluid, the first carrier fluid, and/or the second carrier fluid.

Reaction products may form from a variety of suitable reactions. In some embodiments, first and second polyelectrolytes of opposite charge may interact to form the reaction product. The first and second polyelectrolytes may be electrostatically attracted to each other in solution and/or may release counter ions when they interact. One or both of these factors may drive precipitation of reaction products comprising both the first polyelectrolyte and the second polyelectrolyte from a carrier fluid (e.g., a mixture carrier fluid). In certain embodiments, the reaction product may form from a coacervation reaction. Forming the reaction product may comprise forming a polyelectrolyte complex (e.g., a polyelectrolyte complex comprising first and second polyelectrolytes). Other reactions, such as acid-base reactions, may also cause reaction products to form.

A reaction product may have a variety of suitable morphologies on a surface. In some embodiments, such as that shown in FIG. 1C, the reaction product may cover one or more discontinuous portions of the surface. In certain cases, the reaction product may cover a single contiguous portion of the surface, and/or may cover the entirety of the surface.

Figure 1D:
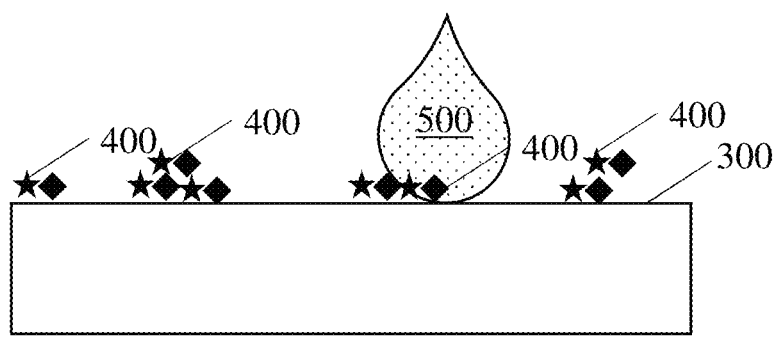
FIG. 1D shows one non-limiting example of a method of applying a composition to a surface on which a reaction product is disposed.
Figure 2A:
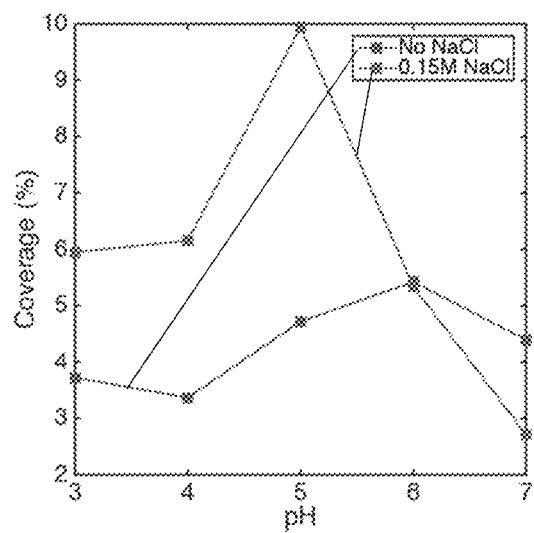
FIG. 2A is a chart showing surface coverage as a function of pH, according to certain embodiments.
Figure 2B:
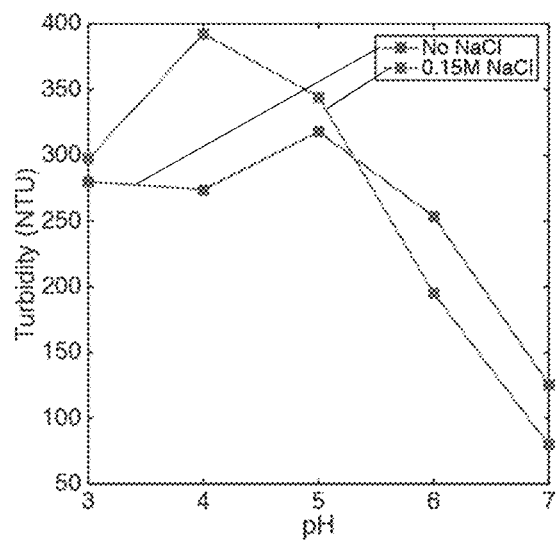
FIG. 2B is a chart showing turbidity as a function of pH, according to certain embodiments.
Figure 2C:
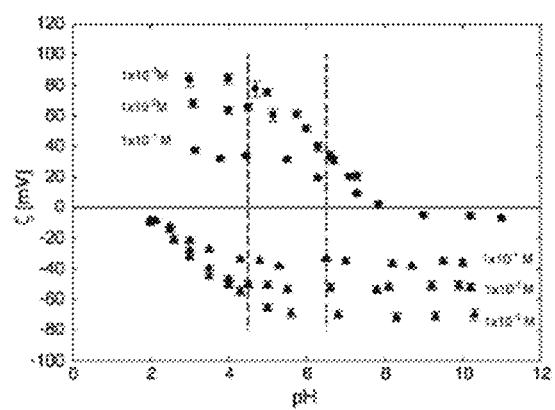
FIG. 2C is a chart showing zeta potential as a function of pH, according to certain embodiments.
Figure 3A:
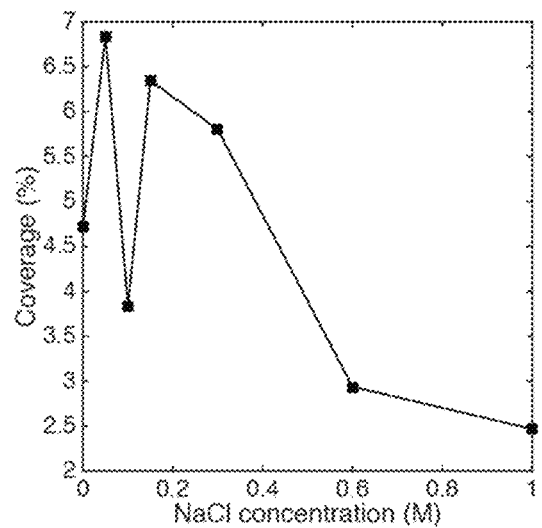
FIG. 3A is a chart showing surface coverage as a function of NaCl concentration, according to certain embodiments.
Figure 3B:
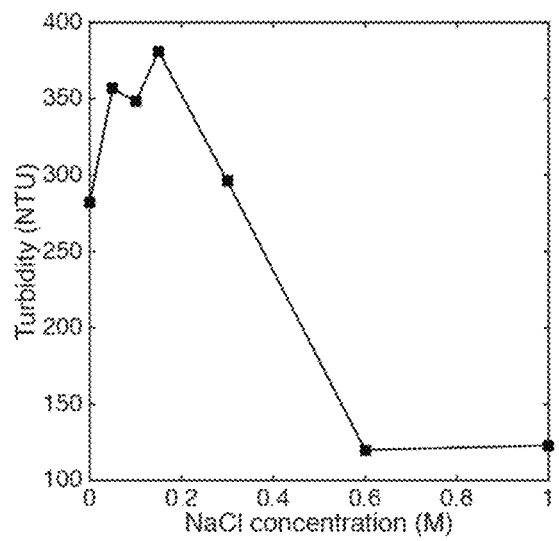
FIG. 3B is a chart showing turbidity as a function of NaCl concentration, according to certain embodiments.
Figure 4A:
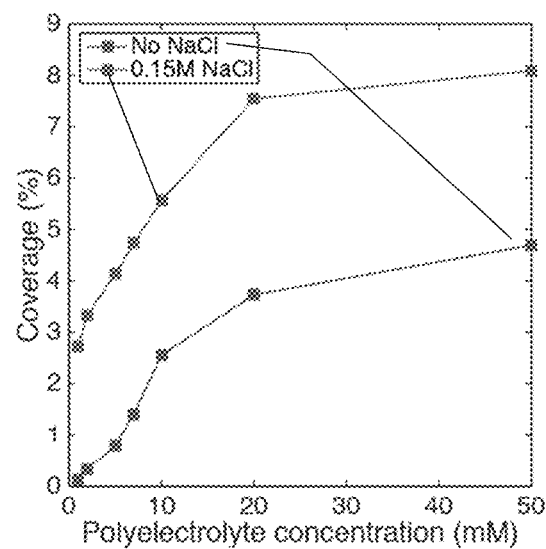
FIG. 4A is a chart showing surface coverage as a function of polyelectrolyte concentration, according to certain embodiments.
Figure 4B:
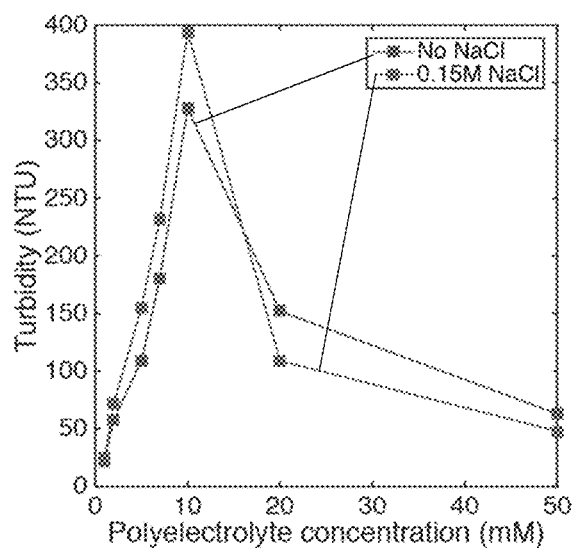
FIG. 4B is a chart showing turbidity as a function of polyelectrolyte concentration, according to certain embodiments.

In some methods, one or more further steps may be performed. The further steps may be performed after formation of a reaction product on a surface (e.g., as a component of a method that comprises forming a reaction product on a surface) or at another time. One example of a further step is a step of applying a composition to the surface. FIG. 1D shows a step of applying a composition 500 to a surface 300 on which a reaction product 400 is disposed. As will be described in more detail below, the composition may comprise one, more, or none of a first carrier fluid, a second carrier fluid, a mixture carrier fluid, a first polyelectrolyte, and a second polyelectrolyte. The composition may comprise one or more species configured to confer a benefit on the surface.

If applied to a surface, a composition may be applied at a variety of suitable points in time and at a variety of suitable locations. For example, the composition may be applied to the surface prior to the application of either or both of the first and second polyelectrolytes, at the same time as the application of either or both of the first and second polyelectrolytes, and/or after application of either or both of the first and second polyelectrolytes. The composition may be applied to the surface prior to the formation of a reaction product thereon, as the reaction product is forming thereon, and/or after the reaction product has formed thereon. The composition may be applied to a surface on which one, more than one, or none of the first carrier fluid, the second carrier fluid, and the mixture carrier fluid are disposed. The composition may be applied to portions of the surface that lack reaction products, to portions of the surface on which reaction products are disposed, and/or to both portions of the surface on which reaction products are disposed and portions of the surface on which reaction products are not disposed.

It should be understood that, if applied to a surface, a third composition may be applied to the surface in any of the manners described above with respect to the first and second polymers and carrier fluids or in any other manner.

Some embodiments relate to compositions and/or kits. The compositions and/or kits may comprise one or more components configured to form a portion or portions of one or more of the articles described herein (e.g., portion(s) of a carrier fluid, a portion(s) of a mixture carrier fluid, portion(s) of a reaction product). By way of example, a composition and/or a kit may comprise a first polyelectrolyte and a second polyelectrolyte. The first and second polyelectrolytes may be configured to be applied to be applied to a surface to form a reaction product by one or more of the methods described elsewhere herein and/or having one or more of the properties described elsewhere herein. In some embodiments, the first and second polyelectrolytes are configured to be components of a mixture carrier fluid having one or more of the properties described elsewhere herein. It should be understood that the first and second polyelectrolytes may be provided with first and second carrier fluids, may be configured to be added to first and/or second carrier fluids not provided therewith (i.e., first and/or second carrier fluids that do not form a portion of the composition and/or kit), or may be configured to be introduced to a mixture carrier fluid in another manner.

In some embodiments, one or more of the first carrier fluid, second carrier fluid, and mixed carrier fluid may comprise water. In other words, the first second carrier fluid, second carrier fluid, and/or mixed carrier fluid may be aqueous fluid(s).

In some embodiments, one or more carrier fluids (e.g., a first carrier fluid, a second carrier fluid, a mixture carrier fluid) may comprise a salt. Without wishing to be bound by any particular theory, it is believed that the presence of a salt in the mixture carrier fluid may enhance the formation of reaction products with advantageous properties. It is believed that the salt may weaken electrostatic interactions between oppositely charged polyelectrolytes, which may promote enhanced polyelectrolyte aggregation when the salt is present in low amounts and reduced polyelectrolyte aggregation when the salt is present in high amounts. It is believed that mixture carrier fluids that comprise an amount of salt that leads to a desired level and/or rate of polyelectrolyte aggregation (e.g., a level of polyelectrolyte aggregation that promotes the formation of reaction products that enhance droplet retention, polyelectrolyte aggregation at a rate that enhances droplet retention) may be beneficial.

In some embodiments, a salt present in a carrier fluid (e.g., a first carrier fluid, a second carrier fluid, a mixture carrier fluid) may have a relatively low molecular weight. The molecular weight of the salt may be less than or equal to 1 kg/mol, less than or equal to 750 g/mol, less than or equal to 500 g/mol, or less than or equal to 200 g/mol. The molecular weight of the salt may be greater than 0 g/mol, greater than or equal to 100 g/mol, greater than or equal to 200 g/mol, greater than or equal to 500 g/mol, or greater than or equal to 750 g/mol. Combinations of the above-referenced ranges are also possible (e.g., from 0 g/mol to 1 kg/mol, or from 0 g/mol to 200 g/mol). Other ranges are also possible.

When present, the salt may comprise a variety of suitable cations. The salt may comprise monovalent cations, divalent cations, trivalent cations, tetravalent cations, and/or cations of higher valency. The salt may comprise monatomic cations and/or polyatomic cations. Non-limiting examples of suitable cations include $Li^+$, $Na^+$, $K^+$, $Be^{2+}$, $Mg^{2+}$, $Ca^{2+}$, and $Ba^{2+}$.

When present, the salt may comprise a variety of suitable anions. The salt may comprise monovalent anions, divalent anions, trivalent anions, tetravalent anions, and/or anions of higher valency. The salt may comprise monatomic anions and/or polyatomic anions. Non-limiting examples of suitable anions include $F^-$, $Cl^-$, $Br^-$, $I^-$, $O^{2-}$, $S^{2-}$, and $CO_3^{2-}$.

Non-limiting examples of suitable salts include LiI, NaCl, NaBr, $Na_2O$, KCl, $K_2S$, $BeCl_2$, BeO, $MgCl_2$, MgO, $MgCO_3$, $CaCl_2$, $CaI_2$, CaS, $CaCO_3$, $BaF_2$, and BaO.

A salt may be present in a carrier fluid (e.g., a first carrier fluid, a second carrier fluid, a mixture carrier fluid) at a variety of suitable concentrations. The concentration of the salt in the carrier fluid may be greater than or equal to 0.01 M, greater than or equal to 0.02 M, greater than or equal to 0.05 M, greater than or equal to 0.1 M, greater than or equal to 0.2 M, greater than or equal to 0.3 M, or greater than or equal to 0.4 M. The concentration of the salt in the carrier fluid may be less than or equal to 0.5 M, less than or equal to 0.4 M, less than or equal to 0.3 M, less than or equal to 0.2 M, less than or equal to 0.1 M, less than or equal to 0.05 M, or less than or equal to 0.02 M. Combinations of the above-referenced ranges are also possible (e.g., from 0.01 M to 0.5 M, or from 0.05 M to 0.2 M). Other ranges are also possible.

As described above, certain embodiments relate to polyelectrolytes in carrier fluids and/or reaction products (e.g., first polyelectrolytes, second polyelectrolytes). Some embodiments relate to polyelectrolytes in compositions and/or kits. A variety of suitable polyelectrolytes may be employed. The polyelectrolytes may include polymers comprising one or more repeating units that are charged in certain circumstances (e.g., in certain aqueous carrier fluids, in certain reaction products, in all circumstances), such as acidic groups and/or basic groups. The polyelectrolytes may also comprise other repeating units that are uncharged (e.g., in the same circumstances in which one or more repeating units therein are charged). In some embodiments, one or both of the first polyelectrolyte and the second polyelectrolyte is a biological polyelectrolyte. Non-limiting examples of suitable biological polyelectrolytes include polysaccharides, DNA, RNA, chitosan, alginic acid, poly(L-lysine), poly(L-glutamic acid), carrageenan, heparin, and hyaluronic acid. In some embodiments, one or both of the first polyelectrolyte and the second polyelectrolyte is a chemically modified biological polyelectrolyte, such as pectin, chitosan, cellulose-based polyelectrolytes, starch-based polyelectrolytes, and dextran-based polyelectrolytes. In some embodiments, one or both of the first polyelectrolyte and the second polyelectrolyte is a synthetic polyelectrolyte. Non-limiting examples of synthetic polyelectrolytes include poly(ethylene imine) (e.g., linear poly(ethylene imine)), poly(acrylic acid), poly(vinylbenzyltrialkyl ammonium), poly(4-vinyl-N-alkylpyridinium), poly(acryloyloxyalkyltrialkyl ammonium), poly(acrylamidoalkyltrialkyl ammonium), poly(diallyldimethyl ammonium), poly(styrene sulfonic acid), poly (vinyl sulfonic acid), poly(methacrylic acid), poly(itaconic acid), and maleic acid diallyl amine copolymers. The first and/or second polyelectrolytes may be biodegradable and/or non-toxic.

In some embodiments, both a first polyelectrolyte and a second polyelectrolyte may be present in a carrier fluid (e.g., a mixture carrier fluid). Without wishing to be bound by any particular theory, it is believed that certain combinations of the concentration of the first polyelectrolyte in the carrier fluid and the second polyelectrolyte in the carrier fluid may be advantageous. It is believed that carrier fluids in which the concentration of the first polyelectrolyte and/or the concentration of the second polyelectrolyte are low may hinder reaction product formation such that the reaction products that form therefrom cover an undesirably low area fraction of a surface on which the mixture carrier fluid is disposed and/or form too slowly to arrest appreciable droplet bouncing or rolling off the surface. It is believed that carrier fluids in which both the concentration of the first polyelectrolyte and the concentration of the second polyelectrolyte are high may form gels instead of precipitating reaction products onto the surface. Carrier fluids in which both the first polyelectrolyte and the second polyelectrolyte are present in advantageous concentrations may have neither of these drawbacks.

A carrier fluid comprising both a first polyelectrolyte and a second polyelectrolyte (e.g., a mixture carrier fluid) may comprise both the first polyelectrolyte and the second polyelectrolyte in an amount of greater than or equal to 1 mM, greater than or equal to 2 mM, greater than or equal to 5 mM, greater than or equal to 10 mM, or greater than or equal to 20 mM. The concentration of the first polyelectrolyte in the carrier fluid and the concentration of the second polyelectrolyte in the carrier fluid may both be less than or equal to 30 mM, less than or equal to 20 mM, less than or equal to 10 mM, less than or equal to 5 mM, or less than or equal to 2 mM. Combinations of the above-referenced ranges are also possible (e.g., from 1 mM to 30 mM, from 5 mM to 20 mM). Other ranges are also possible.

A first polyelectrolyte, if present in a carrier fluid (e.g., a first carrier fluid, a mixture carrier fluid), may be present at a variety of suitable concentrations in the carrier fluid. The concentration of the first polyelectrolyte in the carrier fluid (e.g., first carrier fluid, mixture carrier fluid) may be greater than or equal to 1 mM, greater than or equal to 2 mM, greater than or equal to 5 mM, greater than or equal to 10 mM, or greater than or equal to 20 mM. The concentration of the first polyelectrolyte in the carrier fluid (e.g., first carrier fluid, mixture carrier fluid) may be less than or equal to 30 mM, less than or equal to 20 mM, less than or equal to 10 mM, less than or equal to 5 mM, or less than or equal to 2 mM. Combinations of the above-referenced ranges are also possible (e.g., from 1 mM to 30 mM, from 5 mM to 20 mM). Other ranges are also possible.

A second polyelectrolyte, if present in a carrier fluid (e.g., a second carrier fluid, a mixture carrier fluid), may be present at a variety of suitable concentrations in the carrier fluid. The concentration of the second polyelectrolyte in the carrier fluid (e.g., second carrier fluid, mixture carrier fluid) may be greater than or equal to 1 mM, greater than or equal to 2 mM, greater than or equal to 5 mM, greater than or equal to 10 mM, or greater than or equal to 20 mM. The concentration of the second polyelectrolyte in the carrier fluid (e.g., second carrier fluid, mixture carrier fluid) may be less than or equal to 30 mM, less than or equal to 20 mM, less than or equal to 10 mM, less than or equal to 5 mM, or less than or equal to 2 mM. Combinations of the above-referenced ranges are also possible (e.g., from 1 mM to 30 mM, from 5 mM to 20 mM). Other ranges are also possible.

In some embodiments, a mixture carrier fluid may have a pH that is advantageous. Without wishing to be bound by any particular theory, it is believed that polyelectrolyte charge varies with pH. It is believed that lower values of pH favor protonation of acids and higher values of pH favor deprotonation of acids. Accordingly, polyelectrolytes comprising acidic groups that are neutral when protonated tend to be neutrally charged at lower values of pH and negatively charged at higher values of pH (polyelectrolytes comprising acidic groups that are positively charged when protonated tend to be positively charged at lower values of pH and less positively charged, neutrally charged, or negatively charged at higher values of pH). It is believed that when the pH of the mixture carrier fluid is equivalent to the pKa of the polyelectrolyte, half of the acidic groups thereon are protonated and half of the acidic groups thereon are deprotonated. For a given polyelectrolyte with a given pKa, certain values of pH of the mixture carrier fluid may result in the polyelectrolyte having a higher level of charge. As an example, increasing the pH of the mixture carrier fluid may increase the absolute value of the polyelectrolyte charge for polyelectrolytes that become negatively charged when deprotonated. As another example, decreasing the pH of the mixture carrier fluid may increase the absolute value of the polyelectrolyte charge for polyelectrolytes that become positively charged when protonated.

In some embodiments, it may be beneficial for a mixture carrier fluid to comprise two polyelectrolytes of opposite charge (e.g., a first polyelectrolyte with a first charge and a second polyelectrolyte with a second, opposite, charge), each of which have a charge with an absolute value in excess of a certain amount. Such polyelectrolytes may interact favorably, as described elsewhere herein. The pH of the mixture carrier fluid may be selected such that it is above the pKa of the negatively charged polyelectrolyte (e.g., the first polyelectrolyte, the second polyelectrolyte) and below the pKa of the positively charged polyelectrolyte (e.g., the first polyelectrolyte, the second polyelectrolyte). The pH of the mixture carrier fluid may be greater than or equal to 3, greater than or equal to 3.5, greater than or equal to 4, greater than or equal to 4.5, greater than or equal to 5, greater than or equal to 5.5, greater than or equal to 6, greater than or equal to 6.5, greater than or equal to 7, or greater than or equal to 7.5. The pH of the mixture carrier fluid may be less than or equal to 8, less than or equal to 7.5, less than or equal to 7, less than or equal to 6.5, less than or equal to 6, less than or equal to 5.5, less than or equal to 5, less than or equal to 4.5, less than or equal to 4, or less than or equal to 3.5. Combinations of the above-referenced ranges are also possible (e.g., from 3 to 8, or from 5 to 7). Other ranges are also possible. The pH of the mixture carrier fluid may be determined with a pH meter.

The pH of the first carrier fluid, if present, may be a variety of suitable values. The pH of the first carrier fluid may be greater than or equal to 3, greater than or equal to 3.5, greater than or equal to 4, greater than or equal to 4.5, greater than or equal to 5, greater than or equal to 5.5, greater than or equal to 6, greater than or equal to 6.5, greater than or equal to 7, or greater than or equal to 7.5. The pH of the first carrier fluid may be less than or equal to 8, less than or equal to 7.5, less than or equal to 7, less than or equal to 6.5, less than or equal to 6, less than or equal to 5.5, less than or equal to 5, less than or equal to 4.5, less than or equal to 4, or less than or equal to 3.5. Combinations of the above-referenced ranges are also possible (e.g., from 3 to 8, or from 5 to 7). Other ranges are also possible. The pH of the first carrier fluid may be determined with a pH meter.

The pH of the second carrier fluid, if present, may be a variety of suitable values. The pH of the second carrier fluid may be greater than or equal to 3, greater than or equal to 3.5, greater than or equal to 4, greater than or equal to 4.5, greater than or equal to 5, greater than or equal to 5.5, greater than or equal to 6, greater than or equal to 6.5, greater than or equal to 7, or greater than or equal to 7.5. The pH of the second carrier fluid may be less than or equal to 8, less than or equal to 7.5, less than or equal to 7, less than or equal to 6.5, less than or equal to 6, less than or equal to 5.5, less than or equal to 5, less than or equal to 4.5, less than or equal to 4, or less than or equal to 3.5. Combinations of the above-referenced ranges are also possible (e.g., from 3 to 8, or from 5 to 7). Other ranges are also possible. The pH of the second carrier fluid may be determined with a pH meter.

As described above, it may be advantageous for one or more polyelectrolytes present in one or more carrier fluids (e.g., a first polyelectrolyte in a first carrier fluid, a second polyelectrolyte in a second carrier fluid, a first polyelectrolyte in a mixture carrier fluid, a second polyelectrolyte in a mixture carrier fluid, both a first and second polyelectrolyte in a mixture carrier fluid) to have a charge with an absolute value in excess of a certain amount. The zeta potential of the polyelectrolyte may be indicative of its charge. Accordingly, it may be advantageous for one or more polyelectrolytes in one or more carrier fluids to have a zeta potential in excess of a certain amount.

In some embodiments, an absolute value of a zeta potential of a first polyelectrolyte in a first carrier fluid is greater than or equal to 5 mV, greater than or equal to 10 mV, greater than or equal to 15 mV, greater than or equal to 20 mV, greater than or equal to 50 mV, greater than or equal to 75 mV, or greater than or equal to 100 mV. The absolute value of the zeta potential of the first polyelectrolyte in the first carrier fluid may be less than or equal to 120 mV, less than or equal to 100 mV, less than or equal to 75 mV, less than or equal to 50 mV, less than or equal to 20 mV, less than or equal to 15 mV, or less than or equal to 10 mV. Combinations of the above-referenced ranges are also possible (e.g., from 5 mV to 120 mV, or from 20 mV to 120 mV). Other ranges are also possible. It should be understood that absolute values of zeta potentials refer to the magnitude of the zeta potential (e.g., a polyelectrolyte with a zeta potential with an absolute value of greater than or equal to 5 mV may have a zeta potential of greater than or equal to 5 mV or may have a zeta potential of less than or equal to −5 mV). The zeta potential of the first polyelectrolyte in the first carrier fluid may be determined by a commercially available zeta sizer.

In some embodiments, an absolute value of a zeta potential of a first polyelectrolyte in a mixture carrier fluid is greater than or equal to 5 mV, greater than or equal to 10 mV, greater than or equal to 15 mV, greater than or equal to 20 mV, greater than or equal to 50 mV, greater than or equal to 75 mV, or greater than or equal to 100 mV. The absolute value of the zeta potential of the first polyelectrolyte in the mixture carrier fluid may be less than or equal to 120 mV, less than or equal to 100 mV, less than or equal to 75 mV, less than or equal to 50 mV, less than or equal to 20 mV, less than or equal to 15 mV, or less than or equal to 10 mV. Combinations of the above-referenced ranges are also possible (e.g., from 5 mV to 120 mV, or from 20 mV to 120 mV). Other ranges are also possible. It should be understood that absolute values of zeta potentials refer to the magnitude of the zeta potential (e.g., a polyelectrolyte with a zeta potential with an absolute value of greater than or equal to 5 mV may have a zeta potential of greater than or equal to 5 mV or may have a zeta potential of less than or equal to −5 mV). The zeta potential of the first polyelectrolyte in the mixture carrier fluid may be determined by a commercially available zeta sizer.

In some embodiments, an absolute value of a zeta potential of a second polyelectrolyte in a second carrier fluid is greater than or equal to 5 mV, greater than or equal to 10 mV, greater than or equal to 15 mV, greater than or equal to 20 mV, greater than or equal to 50 mV, greater than or equal to 75 mV, or greater than or equal to 100 mV. The absolute value of the zeta potential of the second polyelectrolyte in the second carrier fluid may be less than or equal to 120 mV, less than or equal to 100 mV, less than or equal to 75 mV, less than or equal to 50 mV, less than or equal to 20 mV, less than or equal to 15 mV, or less than or equal to 10 mV. Combinations of the above-referenced ranges are also possible (e.g., from 5 mV to 120 mV, or from 20 mV to 120 mV). Other ranges are also possible. It should be understood that absolute values of zeta potentials refer to the magnitude of the zeta potential (e.g., a polyelectrolyte with a zeta potential with an absolute value of greater than or equal to 5 mV may have a zeta potential of greater than or equal to 5 mV or may have a zeta potential of less than or equal to −5 mV). The zeta potential of the second polyelectrolyte in the second carrier fluid may be determined by a commercially available zeta sizer.

In some embodiments, an absolute value of a zeta potential of a second polyelectrolyte in a mixture carrier fluid is greater than or equal to 5 mV, greater than or equal to 10 mV, greater than or equal to 15 mV, greater than or equal to 20 mV, greater than or equal to 50 mV, greater than or equal to 75 mV, or greater than or equal to 100 mV. The absolute value of the zeta potential of the second polyelectrolyte in the mixture carrier fluid may be less than or equal to 120 mV, less than or equal to 100 mV, less than or equal to 75 mV, less than or equal to 50 mV, less than or equal to 20 mV, less than or equal to 15 mV, or less than or equal to 10 mV. Combinations of the above-referenced ranges are also possible (e.g., from 5 mV to 120 mV, or from 20 mV to 120 mV). Other ranges are also possible. It should be understood that absolute values of zeta potentials refer to the magnitude of the zeta potential (e.g., a polyelectrolyte with a zeta potential with an absolute value of greater than or equal to 5 mV may have a zeta potential of greater than or equal to 5 mV or may have a zeta potential of less than or equal to −5 mV). The zeta potential of the second polyelectrolyte in the mixture carrier fluid may be determined by a commercially available zeta sizer.

In some embodiments, absolute values of both a first polyelectrolyte and a second polyelectrolyte in a mixture carrier fluid are greater than or equal to 5 mV, greater than or equal to 10 mV, greater than or equal to 15 mV, greater than or equal to 20 mV, greater than or equal to 50 mV, greater than or equal to 75 mV, or greater than or equal to 100 mV. The absolute values of the zeta potentials of both the first polyelectrolyte and the second polyelectrolyte in the mixture carrier fluid may be less than or equal to 120 mV, less than or equal to 100 mV, less than or equal to 75 mV, less than or equal to 50 mV, less than or equal to 20 mV, less than or equal to 15 mV, or less than or equal to 10 mV. Combinations of the above-referenced ranges are also possible (e.g., from 5 mV to 120 mV, or from 20 mV to 120 mV). Other ranges are also possible. The first polyelectrolyte and the second polyelectrolyte typically have opposite values of zeta potential (e.g., when both the first polyelectrolyte and the second polyelectrolyte have zeta potentials with an absolute value of greater than or equal to 5 mV, the first polyelectrolyte may have a zeta potential of greater than or equal to 5 mV in the mixture carrier fluid and the second polyelectrolyte may have a zeta potential of less than or equal to −5 mV in the mixture carrier fluid). The zeta potential of the first and second polyelectrolytes in the mixture carrier fluid may be determined by a commercially available zeta sizer.

In some embodiments, a carrier fluid (e.g., a first carrier fluid, a second carrier fluid, a mixture carrier fluid) may have a viscosity that is advantageous. Without wishing to be bound by any particular theory, it is believed that the viscosity of the carrier fluid may be indicative of one or more properties of the carrier fluid that affect its utility for forming advantageous reaction products. As an example, high viscosities may be indicative of gels while lower viscosities may be indicative of fluids that are not gels. In certain cases, it may be desirable for certain carrier fluids not to be gels. A carrier fluid (e.g., a first carrier fluid, a second carrier fluid, a mixture carrier fluid) may have a viscosity of less than or equal to 1 Pa*s, less than or equal to 0.5 Pa*s, less than or equal to 0.2 Pa*s, or less than or equal to 0.1 Pa*s. The viscosity of the carrier fluid may be determined by a viscometer.

A carrier fluid (e.g., a first carrier fluid, a second carrier fluid, a mixture carrier fluid) may have a variety of suitable turbidities. Without wishing to be bound by any particular theory, it is believed that certain values of turbidity may be indicative of one or more properties of the carrier fluid that affect its utility for forming advantageous reaction products. As an example, higher values of turbidity may be indicative of carrier fluids comprising a large number of reaction products and/or reaction products of an appreciable size. High values of turbidity may be indicative of a desirable extent of reaction product formation. The turbidity of a carrier fluid from which the formation of reaction products is desirable (e.g., a mixture carrier fluid) may be greater than or equal to 10 NTU, greater than or equal to 20 NTU, greater than or equal to 50 NTU, or greater than or equal to 100 NTU. The turbidity of the carrier fluid may be determined by a nephelometer.

As described above, certain methods may further comprise applying a composition to a surface (e.g., a composition other than a first polyelectrolyte in a first carrier fluid, a second polyelectrolyte in a second carrier fluid, and a mixture carrier fluid; a composition that comprises one or more of the first polyelectrolyte in the first carrier fluid, the second polyelectrolyte in the second carrier fluid, and/or a mixture carrier fluid). The composition may be provided with a composition and/or kit further comprising a first polyelectrolyte and a second polyelectrolyte (and, optionally, a first carrier fluid and/or a second carrier fluid) as described elsewhere herein or may be provided separately. In some embodiments, a composition and/or kit as described elsewhere herein is configured to be mixed with the relevant composition and/or applied with the relevant composition to a surface. The composition may comprise water. In other words, the composition may be an aqueous composition.

In some embodiments, a carrier fluid (e.g., a first carrier fluid, a second carrier fluid, a mixture carrier fluid), a composition (e.g., a composition applied to the surface prior to the application of either or both of the first and second polyelectrolytes, at the same time as the application of either or both of the first and second polyelectrolytes, and/or after application of either or both of the first and second polyelectrolytes; a composition applied to a surface prior to the formation of a reaction product thereon, as the reaction product is forming thereon, and/or after the reaction product has formed thereon; a composition applied to a surface on which one, more than one, or none of the first carrier fluid, the second carrier fluid, and the mixture carrier fluid are disposed), and/or a reaction product may further comprise one or more additional species. The additional species may be an active agent, such as a species that confers a beneficial property onto the carrier fluid and/or a surface on which the carrier fluid is disposed (and/or configured to be disposed), such as pest resistance, coloration, flavoring, etc. Non-limiting examples of suitable active agents include agricultural chemicals (e.g., pesticides, herbicides, fertilizers, nutrients), pigments, paints, flavorings, pharmaceutically active ingredients, cosmetics, anti-icing liquids, and fire retardant species. In some embodiments, the active agent may be a pesticide that comprises one or more of dichlorodiphenyltrichloroethane (DDT), hexachlorocyclohexane (HCH), and pentachlorophenol (PCP).

As described above, certain methods comprise applying one or more fluids (e.g., a first carrier fluid, a second carrier fluid, a composition comprising a fluid) to a surface. A wide variety of surfaces may be employed. For example, the surface may be a portion of a plant, such as a portion of a leaf, a portion of a root, a portion of a fruit, a portion of a vegetable, and/or a portion of a flower. In some embodiments, the surface may be a portion of a fungus and/or a portion of an insect. In some embodiments, the surface may comprise a portion of a produce item or a surface of a form of vegetation. In certain embodiments, the surface may comprise an edible non-toxic item such as a food item.

A surface as described herein may have a variety of suitable roughnesses. The roughness of the surface may be greater than or equal to 1 nm, greater than or equal to 2 nm, greater than or equal to 5 nm, greater than or equal to 10 nm, greater than or equal to 20 nm, greater than or equal to 50 nm, greater than or equal to 100 nm, greater than or equal to 200 nm, greater than or equal to 500 nm, greater than or equal to 1 micron, greater than or equal to 2 microns, greater than or equal to 5 microns, greater than or equal to 10 microns, greater than or equal to 20 microns, or greater than or equal to 50 microns. The roughness of the surface may be less than or equal to 100 microns, less than or equal to 50 microns, less than or equal to 20 microns, less than or equal to 10 microns, less than or equal to 5 microns, less than or equal to 2 microns, less than or equal to 1 micron, less than or equal to 500 nm, less than or equal to 200 nm, less than or equal to 100 nm, less than or equal to 50 nm, less than or equal to 20 nm, less than or equal to 10 nm, less than or equal to 5 nm, or less than or equal to 2 nm. Combinations of the above-referenced ranges are also possible (e.g., from 1 nm to 100 microns, or from 20 nm to 10 microns). Other ranges are also possible. The roughness of the surface may be determined by atomic force microscopy.

A surface may have a variety of suitable contact angles with water (e.g., prior to exposure to one, some, or all of a first carrier fluid, a second carrier fluid, and a mixture carrier fluid; prior to application of the first polyelectrolyte and/or the second polyelectrolyte; prior to formation of the reaction product). The water contact angle of the surface may be greater than or equal to 90°, greater than or equal to 100°, greater than or equal to 110°, greater than or equal to 120°, greater than or equal to 130°, greater than or equal to 140°, greater than or equal to 150°, greater than or equal to 160°, or greater than or equal to 170°. The water contact angle of the surface may be less than or equal to 180°, less than or equal to 170°, less than or equal to 160°, less than or equal to 150°, less than or equal to 140°, less than or equal to 130°, less than or equal to 120°, less than or equal to 110°, or less than or equal to 100°. Combinations of the above-referenced ranges are also possible (e.g., from 90° to 180°). Other ranges are also possible. The water contact angle of the surface may be determined with a goniometer.

Certain methods described herein result in the retention of large volumes of fluid on surfaces (e.g., large volumes of one or more of a first carrier fluid, a second carrier fluid, a mixture carrier fluid, a composition comprising a fluid). In some embodiments, performing a method as described herein (e.g., applying the first and second polyelectrolytes to the surface) causes the surface to hold greater than or equal to 0.5 mL/cm$^2$ of a fluid, greater than or equal to 1 mL/cm$^2$ of a fluid, greater than or equal to 2 mL/cm$^2$ of a fluid, greater than or equal to 4 mL/cm$^2$ of a fluid, greater than or equal to 10 mL/cm$^2$ of a fluid, greater than or equal to 20 mL/cm$^2$ of a fluid, or greater than or equal to 40 mL/cm$^2$ of a fluid. Performing a method as described herein may cause the surface to hold less than or equal to 100 mL/cm$^2$ of a fluid, less than or equal to 40 mL/cm$^2$ of a fluid, less than or equal to 20 mL/cm$^2$ of a fluid, less than or equal to 10 mL/cm$^2$ of a fluid, less than or equal to 4 mL/cm$^2$ of a fluid, less than or equal to 2 mL/cm$^2$ of a fluid, or less than or equal to 1 mL/cm$^2$ of a fluid. Combinations of the above-referenced ranges are also possible (e.g., from 0.5 mL/cm$^2$ of a fluid to 100 mL/cm$^2$ of a fluid, or from 4 mL/cm$^2$ of a fluid to 40 mL/cm$^2$ of a fluid). Other ranges are also possible. The fluid held by the surface may be determined by determining the area of the surface by image analysis, weighing the surface both prior to and after to performing the method, and then dividing the increase in weight after performing the method by the area of the surface.

In some embodiments, a composition and/or a kit may be provided with directions for use. The directions for use may describe how to employ the composition and/or kit to form a reaction product on a surface. By way of example, the directions for use may comprise instructions for how to perform any of the methods described herein and/or for how to form any of the articles described herein. In some embodiments, the directions for use describe procedures for mixing the component(s) of the composition and/or kit with each other and/or other components not provided therewith. As another example, the directions for use may describe directions for applying first and second carrier fluids formed by the composition and/or kit (and/or one or more components thereof) to a surface. As further examples, the directions for use may comprise storage instructions and/or instructions for assessing the quality of first, second, and/or mixture carrier fluids (and/or articles produced by the composition and/or kit). The directions for use may describe further components not provided with the composition and/or kit that may be added thereto, such as further fluids (e.g., a fluid comprising water), additives, and/or other suitable components.

Certain methods, articles, and systems described herein may be related to those described in International Patent Application No. PCT/US2016/057956, incorporated herein by reference in its entirety.

The following examples are intended to illustrate certain embodiments of the present invention, but do not exemplify the full scope of the invention.

Example 1

Figure 5:
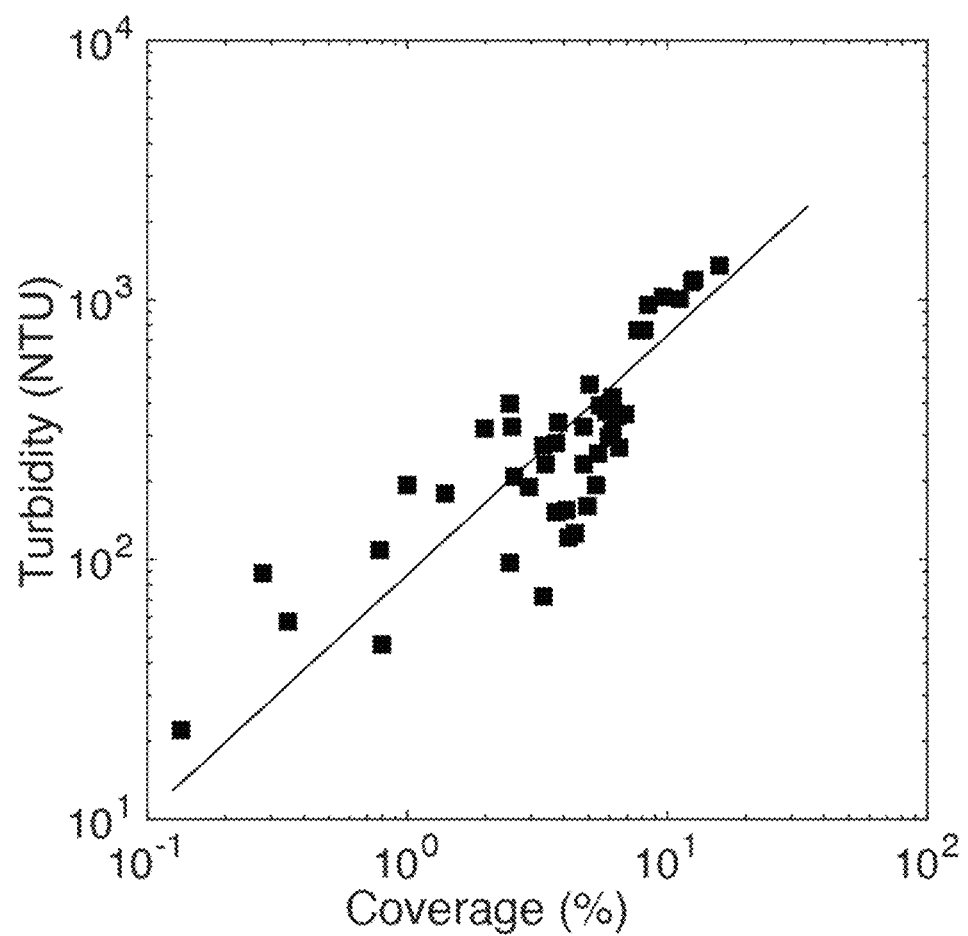
FIG. 5 is a chart showing turbidity as a function of surface coverage, according to certain embodiments.

This Example describes formulations that have enhanced utility for retaining deposited compositions on surfaces. The effects of pH of the formulation, salt concentration in the formulation, and polyelectrolyte concentration in the formulation on deposited composition retention are discussed.

It is shown that precipitate formation upon coalescence of two droplets can be enhanced for the pH that maximizes the zeta potential of both polyelectrolytes.

Polyelectrolytes are typically charged and have a non-zero zeta potential in a range of pH. Precipitation occurs at values of pH where both polyelectrolytes are charged.

It is shown compositions that contain an additional salt (e.g., NaCl) in addition to the polyelectrolytes may be advantageous in comparison to compositions lacking the additional salt. It is also shown that the amount of formed surface precipitates varies non-monotonically with salt concentration in certain cases. It typically first increases with salt concentration, then has a dip and reaches a local minimum, then increases again to a second maximum and then drops continuously as more salt is added. Formulations that have a salt concentration corresponding to one of the two maxima (the maxima are comparable in precipitate formation) may be advantageous. For NaCl used with chitosan and alginate, these maxima are around 0.05 M and 0.15 M.

It is also shown that increasing polyelectrolyte concentration may increase the surface precipitation only up to a certain concentration, after which a plateau is reached. Concentrations in excess of those at the plateau may not show any additional benefit. For chitosan and alginate, the plateau is reached at a polyelectrolyte concentration of about 20 mM. Formulations that have concentrations that are lower or equal to the onset of the plateau may be beneficial.

Finally, a new method to test formulations is demonstrated. Measuring precipitate formation may be time and/or resource consuming. In some cases, the relevant experiments may result in data large error bars. It is shown that the turbidity of mixtures of the two polyelectrolytes of interest may be used as a proxy for the amount of precipitates that will form when solutions comprising the polyelectrolytes are deposited on surfaces. Turbidity can be directly measured with a nephelometer and is a straightforward method that may be used to provide a quantitative comparison between formulations. This method can be used to design new formulations, to fine tune salt concentration, and/or to fine-tune pH to improve efficiency before spraying. This method may be advantageous when using hard water or other contaminated water whose initial pH and salt concentration is unknown.

Polyelectrolytes are macromolecules. For certain polyelectrolytes, a substantial portion of the constitutional units has ionizable or ionic groups, or both. Polyelectrolytes may be water soluble, and, if so, their charged groups may dissociate in solution. Positively charged polyelectrolytes are called polycations and negatively charged ones are called polyanions. Certain polyelectrolytes combine the properties of polymers and salts: their solutions may be viscous at high concentrations, and they may be conductive. Examples of biological polyelectrolytes include polysaccharides and DNA. Synthetic polyelectrolytes also exist.

Polyelectrolytes can be strong or weak, depending on whether they fully or partially dissociate in solution. Weak polyelectrolytes are polyelectrolytes that are not fully charged in solution; the amount to which they are charged can be tuned by changing the pH. To quantify the electric interactions of polyelectrolytes, the zeta potential is commonly used. The zeta potential is the electric potential in the interfacial double layer surrounding the polyelectrolyte, at the location of the stationary layer of fluid attached to the molecule.

Mixing solutions containing positive and negative polyelectrolytes can lead to the self-assembly of polyelectrolyte complexes (PEC) in solution. PECs are polymer aggregates; certain PECs can precipitate out of solution and form solid particles. Some PECs may be formed in reactions that occur on microsecond scales. Some PECs are stable through electrostatic attraction of the oppositely charged ions. Since the interaction is electrostatic, the formation of PECs may depend on the zeta potential of the polyelectrolyte solutions and/or on the ionic strength of the solutions. The formation of PECs may be determined by a number of methods, including mass measurement of complexes, turbidity as a proxy for particle density, viscometry, microscopy and FTIR.

Turbidity is the haziness of a fluid caused by suspended particles. It is measured here with a nephelometer (Sper Scientific Turbidity Meter 860040), an instrument that measures turbidity by using a light beam of wavelength 850 nm and a light detector located at 90° from the source to measure the scattered light by the suspended particles. This measurement may depend on particle density in the solution, particle size, and/or particle shape.

In this Example, the relationship between surface precipitate formation and certain bulk properties, such as turbidity, is investigated. Polyelectrolyte compositions at a range of pH values, salt concentrations, and polyelectrolyte molarities are formulated and studied to greater understand the effect of these parameters on deposition from droplet impacts, and to determine beneficial conditions that enhance the amount of area covered by the precipitates. For several polyelectrolytes, there are salt concentrations and pHs that are beneficial. It is also seen that turbidity measurement may provide a facile way for selecting appropriate mixtures and quantifying the surface precipitation reaction.

The used surface here was a hydrophobic OTS-coated glass slide. For the polyelectrolyte solutions, Chitosan (positively charged) and Alginic Acid (negatively charged) were mixed in various quantities, depending on the desired molarity. Using syringes, a drop of Chitosan solution was placed onto the surface, then a drop of Alginic Acid solution was added. After one minute, a fab wipe was employed to dab away excess liquid (without ever touching the wipe to the glass slide). To dry any remaining liquid, an air gun was used. To analyze the deposition, the deposits were imaged using a microscope and an image analysis tool was used in order to calculate the percent of area that the deposit covered.

Effect of pH

A range of pHs from 3 to 7 were tested, both with and without the addition of 0.15 M NaCl. In order to make the polyelectrolyte solutions the correct pH, HCl and NaOH were added as needed. Four trials were conducted at each pH and salt combination. The results are shown in FIG. 2A. In some cases, the highest coverage occurred at pH 5 with no salt addition. Except for solutions at pH>6, the addition of NaCl increased the number of deposits formed. Turbidity was also recorded for each of the trials, and the results are shown in FIG. 2B. Turbidity results roughly reflect the variations of the coverage as a function of pH for these experiments. The maximums are slightly shifted but the general trends match.

The maximum in precipitate formation around pH 5 observed here may be due to the variation of the zeta potential of the polyelectrolytes employed (FIG. 2C). When observing the zeta potentials of alginate and chitosan as a function of pH, it can be seen that for low pH, alginate is not charged, while for high pH, chitosan is not charged. The pH value of 5 occurs in the center of the region where both polyelectrolytes are charged, at the point where both of the zeta potentials are the highest, which may explain the peak in deposit formation at that value.

Effect of Salt Concentration

The addition of one or more salts to the polyelectrolyte solutions can influence their interaction. Molarities from 0 to 1 M of NaCl were tested, with more of an emphasis on the region between 0 and 0.15 M. The following concentrations were included in the test: 0 M, 0.05 M, 0.10 M, 0.15 M, 0.30 M, 0.60 M, 1.0 M. The pH for this set of experiments (and the following ones) was standardized at 5. The results can be seen in FIGS. 3A and 3B, but essentially, apart from an outlier dip at 0.1 M NaCl, the surface coverage increased with the addition of salt up until a peak, then decreased. Turbidity experiments for the various salt concentrations followed these trends.

At low concentrations, salts may enable the rearrangement of polyelectrolyte molecules by weakening the electrostatic interaction, which may lead to more aggregation. Once the quantity gets too large, however, the salt may screen the charge, which may prevent the complexes from forming. Here, the effect of salt was found to be very dependent on the polyelectrolytes used in the case of PECs.

Effect of Polyelectrolyte Concentration

The concentration of the polyelectrolyte solutions were also varied, at pH 5 and both as 0 M NaCl and 0.15 M NaCl. It was hypothesized that surface coverage would increase linearly along with increase in polyelectrolyte concentration, and the data supports this. FIG. 4A shows a linear relationship until 20 mmol, after which point the solutions appear to have reached a point of saturation. The values above 20 mmol do not continue to increase with the same increments. A clear increase with the addition of NaCl is also observable.

Turbidity experiments in this case show the same linear trends (FIG. 4B) at lower polyelectrolyte concentrations, but not at higher concentrations of polyelectrolytes. At high molarities, the polyelectrolytes combined to form large gel-like structures that are more transparent and cause less light scattering, resulting in low turbidity values.

Turbidity as a Proxy FIG. 5 shows the turbidity values as a function of surface precipitate coverage for all the experiments done with chitosan and alginate varying pH, ionic strength and polyelectrolyte concentration (below saturation). Additional experiments with LPEI and PAA were also included. It can be seen that, although there is some scattering in the data, a linear tendency can be observed through two orders of magnitude. This suggests that turbidity could be used as a proxy for surface precipitate concentration, which may provide a facile way to test and optimize new polyelectrolyte solutions.

CONCLUSION

This Example has demonstrated a mechanism to enhance spray deposition on hydrophobic surfaces through in-situ precipitation of polyelectrolytes on the surface. Defects formed in-situ on the surface during the impact can advantageously pin the impinging droplets. A potential mechanism of precipitate formation in coalescing droplets has been examined, which may enhance understanding of the extent of the precipitation reaction during droplet impacts. Methods described in this Example may allow surface modification and deposition of the liquid of interest in one single step. This Example also explored the effect of polyelectrolyte concentration on droplet pinning. It was shown that this method could work with different types of polyelectrolytes with zeta potential high enough to interact; there are several natural, biodegradable and readily available polyelectrolytes that can be used. It was also shown that the beneficial polyelectrolyte interaction could be achieved at certain values of pH and salt concentration, and that turbidity measurements can be used as a tool to compare efficiency. By adding small amounts of these polyelectrolytes to sprays, the quantity of pesticides used in agricultural applications could be significantly reduced. In certain cases, coverage may be increased. Sprays including limited amounts of pesticides and/or that result in increased coverage may offer protection to the plant and/or may limit the toxic effects of pesticides. Methods described in this Example can also be used for other agricultural sprays, paints, and any other process that involves sprays or droplet deposition.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article comprising:
a product disposed on a surface, wherein:
the product is formed by removing a first polyelectrolyte and a second polyelectrolyte from a mixture carrier fluid disposed on the surface, wherein the mixture carrier fluid is formed by spraying a first carrier fluid comprising the first polyelectrolyte and a second carrier fluid comprising the second polyelectrolyte onto the surface, and wherein removing the first polyelectrolyte and the second polyelectrolyte from the mixture carrier fluid comprises precipitating the first polyelectrolyte and the second polyelectrolyte from the mixture carrier fluid and/or evaporating the mixture carrier fluid, and
the mixture carrier fluid comprises an aqueous solution comprising an active agent, a salt with a molecular weight of less than or equal to 1 kg/mol at a concentration within the mixture carrier fluid of less than 0.2 M, and a concentration of each of the first polyelectrolyte and the second polyelectrolyte within the mixture carrier fluid is greater than or equal to 1 mM and less than or equal to 30 mM, wherein the mixture carrier fluid has a pH between greater than or equal to 5 and less than or equal to 8, a turbidity greater than or equal to 50 NTU, and a viscosity less than or equal to 1 Pa*s, and wherein the active agent comprises an agricultural chemical.

2. The article as in claim 1, wherein the molecular weight of the salt is less than or equal to 200 g/mol.

3. The article as in claim 1, wherein the concentration of the salt within the mixture carrier fluid is greater than or equal to 0.01 M.

4. The article as in claim 1, wherein an absolute value of a zeta potential of the first polyelectrolyte in the mixture carrier fluid is greater than or equal to 5 mV and an absolute value of a zeta potential of the second polyelectrolyte in the mixture carrier fluid is greater than or equal to 5 mV.

5. The article as in claim 1, wherein an absolute value of a zeta potential of the first polyelectrolyte in the mixture carrier fluid is greater than or equal to 20 mV and an absolute value of a zeta potential of the second polyelectrolyte in the mixture carrier fluid is greater than or equal to 20 mV.

6. The article as in claim 1, wherein the concentration of the first polyelectrolyte within the mixture carrier fluid is greater than or equal to 5 mM and less than or equal to 20 mM.

7. The article as in claim 1, wherein the concentration of the second polyelectrolyte within the mixture carrier fluid is greater than or equal to 5 mM and less than or equal to 20 mM.

8. The article as in claim 1, wherein the agricultural chemical is a pesticide.

9. The article as in claim 1, wherein the surface comprises a portion of a plant.

10. The article as in claim 1, wherein the surface has a roughness of from 20 nm to 10 microns.

11. The article as in claim 1, wherein the turbidity of the mixture carrier fluid is greater than or equal to 100 NTU.

12. The article as in claim 1, wherein the viscosity of the mixture carrier fluid is less than or equal to 0.5 Pa*s.

13. The article as in claim 1, wherein at least a portion of the first polyelectrolyte and/or at least a portion of the second polyelectrolyte is not removed from the mixture carrier fluid.

14. A composition and/or kit, comprising:
a first carrier fluid comprising a first polyelectrolyte; and
a second carrier fluid comprising a second polyelectrolyte, wherein:
the first polyelectrolyte and the second polyelectrolyte are different,
the first carrier fluid and the second carrier fluid are configured to form a mixture carrier fluid that comprises the first carrier fluid and/or the second carrier fluid, and
the mixture carrier fluid comprises an aqueous solution comprising an active agent, a salt with a molecular weight of less than or equal to 1 kg/mol at a concentration within the mixture carrier fluid of less than 0.2 M, and a concentration of each of the first polyelectrolyte and the second polyelectrolyte within the mixture carrier fluid is greater than or equal to 1 mM and less than or equal to 30 mM, wherein the mixture carrier fluid has a pH between greater than or equal to 5 and less than or equal to 8, a turbidity greater than or equal to 50 NTU, and a viscosity less than or equal to 1 Pa*s, and wherein the active agent comprises an agricultural chemical.

15. The article as in claim 1, wherein the pH of the mixture carrier fluid is between greater than or equal to 5.5 and less than or equal to 7.

16. The article as in claim 1, wherein the active agent comprises a herbicide, a fertilizer, and/or a nutrient.

* * * * *